May 23, 1961    H. A. GEERDS    2,985,463
FIFTH WHEEL ASSEMBLY
Filed Aug. 1, 1958    2 Sheets-Sheet 1

INVENTOR.
HENRY A. GEERDS
BY
*Price and Heneveld*
ATTORNEYS

May 23, 1961  H. A. GEERDS  2,985,463
FIFTH WHEEL ASSEMBLY
Filed Aug. 1, 1958  2 Sheets-Sheet 2

INVENTOR.
HENRY A. GEERDS
BY
Price and Heneveld
ATTORNEYS

United States Patent Office 2,985,463
Patented May 23, 1961

2,985,463

FIFTH WHEEL ASSEMBLY

Henry A. Geerds, Holland, Mich., assignor to Holland Hitch Company, Holland, Mich., a corporation of Michigan Filed Aug. 1, 1958, Ser. No. 752,559

10 Claims. (Cl. 280—407)

This invention relates to coupling devices in general and more particularly to fifth wheel coupling devices for tractors and trailers.

Fifth wheel trailer coupling devices are most commonly used with heavy duty tractor and trailer units. The tractor or cab unit has the fifth wheel member mounted thereon and disposed to receive a coupling pin provided on the forward end of the trailer unit. The fifth wheel is normally trunnioned so that it is pivotal in the vertical plane, which, with the pivotal nature of the coupling pin, affords a substantially universal joint connection for better roadability of the tractor and trailer combination.

Those trailers which include only a rear set of wheels and ride pig-a-back on the tractor or cab unit, have their load distributed between the trailer and cab wheels. Heretofore it has been necessary to reorient the trailer load to change the axle loading to conform to highway requirements in different states. This is a difficult job once a trailer has been loaded.

It is an object of this invention to disclose an adjustable fifth wheel assembly which will permit changing the axle spacing between a tractor and a trailer carried thereby, and thereby varying the axle loading without requiring any shifting of the trailer load.

It is also an object of this invention to disclose a safe and secure means of interlocking the tractor and trailer units together and the adjustable fifth wheel member to its supporting base.

The fifth wheel member of this invention is hereafter shown and described as being slidable on its supporting base and such as includes means of sequential adjustment with secure interlocking at any chosen intermediate position of adjustment.

Still another object of this invention is to disclose a simple and practical fifth wheel assembly which is adjustable and has few parts, all of which are of sturdy construction and are readily assembled together for use and long service. No complicated mechanism or expensive apparatus is required. The slidable feature and adjustable interlocking means are such as may be readily incorporated within presently known fifth wheel assemblies.

Although this invention is directed principally to an adjustable fifth wheel assembly, it is also an object of this invention to teach certain improvements in trailer coupling mechanisms.

These and other objects and advantages in the practice of this invention will be more apparent in the illustration and description of a working embodiment of the invention, as hereinafter set forth.

Figure 1:
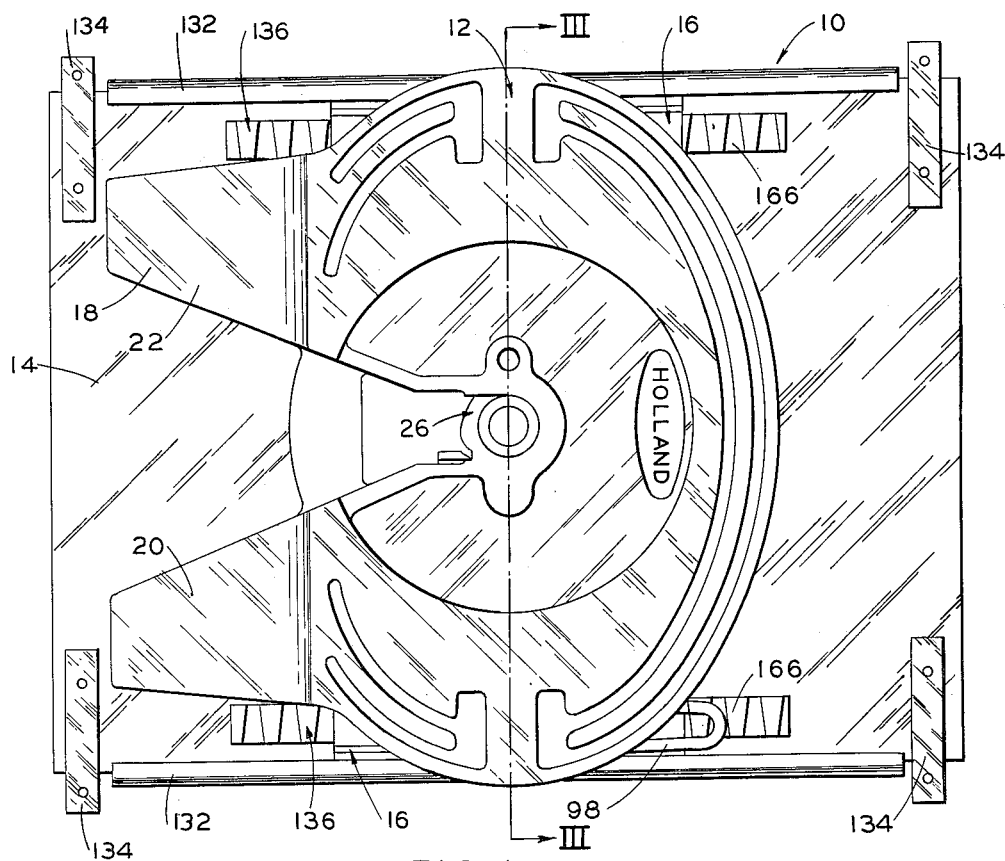
Fig. 1 is a top plan view of the adjustable fifth wheel member of this invention.
Figure 2:
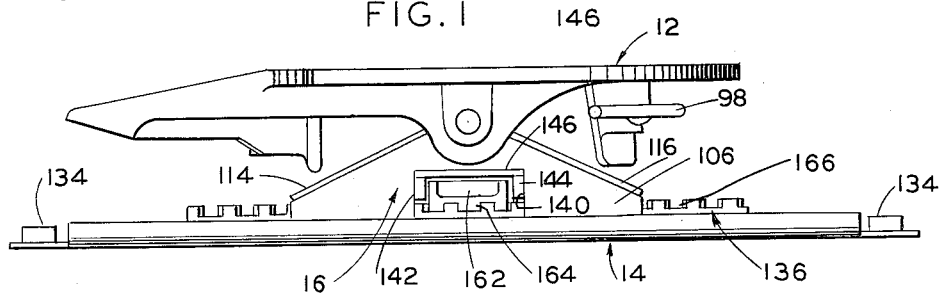
Fig. 2 is a side plan view of the fifth wheel member.
Figure 4:
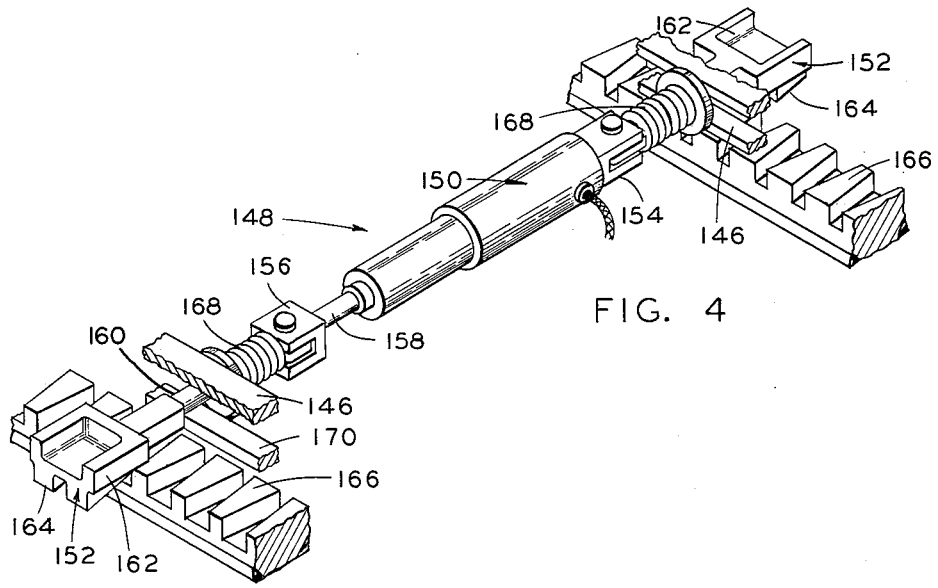
Fig. 4 is a perspective view of the adjustment and interlocking features of this invention as removed from the rest of the fifth wheel assembly.
Figure 3:
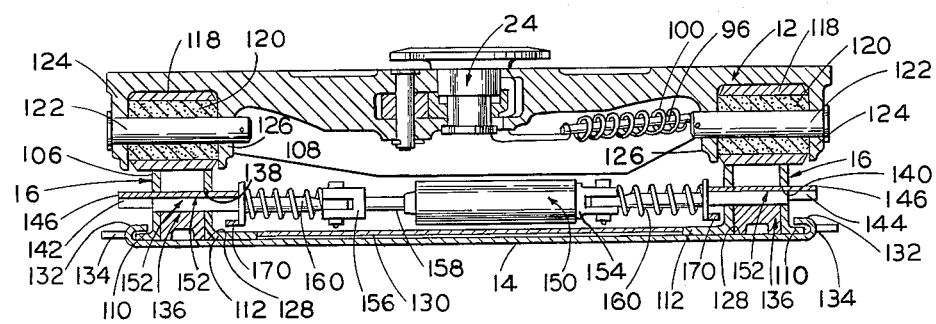
Fig. 3 is a reduced cross sectional view of the fifth wheel member as seen in the plane of line III—III of Fig. 1 and looking in the direction of the arrows thereon.
Figure 5:
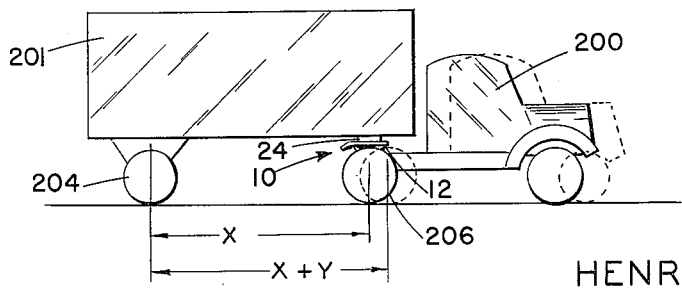
Fig. 5 is a side plan view of a tractor and trailer unit coupled together with the fifth wheel assembly of this invention and showing the tractor in different adjusted positions by phantom outline.

It is proposed to have the trunnion supports for the fifth wheel member slidably mounted on the base plate of the fifth wheel assembly. The base plate is formed to provide suitable and yet simple guide ways for the trunnion supports. Rack bars are provided on the base plate to serve as guide members and as a part of the trunnion support lock means.

The trunnion supports are adapted to receive power actuated plunger or shoe members through their side walls and into locking engagement with the rack bars. The plunger shoes and the rack bars are formed with complementary wedge shaped teeth for both cooperative and secure interengagement. The spacing of the rack teeth enable segmental adjustment of the fifth wheel member. The plunger shoes are operated by a power source which is free to travel with the plunger shoes as they move with the trunnion supports in which they are guided at all times. The power actuator is a relatively simple mechanism adapted to serve in a particularly unique manner. The power actuator simultaneously actuates both plunger shoes to disengage them from the rack bars and to permit adjustment of the fifth wheel member.

Referring to the drawings in further detail, there is shown a fifth wheel assembly 10. The fifth wheel assembly 10 includes a fifth wheel member 12 mounted on a base plate 14. The fifth wheel member 12 is supported on the base plate 14 by trunnion supports 16. The trunnion supports 16 are slidable on the base plate 14 as will be described later.

The fifth wheel member 12 is formed to include structural ribs on its underside and has its upper side relatively flat and unobstructed for receiving the end of a trailer thereover. The trailing edge of the fifth wheel member 12 is formed to include forks 18 and 20. The forks 18 and 20 provide a V-guide slot 22 therebetween. The V-guide slot 22 extends to the center of the fifth wheel plate 12 and is adapted to receive and guide the coupling pin 24 of the trailer unit thereto. The trailer coupling pin 24 is directed centrally of the fifth wheel member 12 for interlocking engagement with a conventional pin locking mechanism 26 mounted on the underside of the fifth wheel member and exposed near the end of the V-guide slot 22.

The fifth wheel plate 12 is mounted on the base plate 14 by trunnion supports 16. The trunnion supports 16 are disposed near opposite side edges of the base plate 14. Each trunnion support 16 includes a pair of triangular shaped and parallel spaced side wall members 106 and 108. Flanges 110 and 112 are formed from the lower edges of the support walls 106 and 108, respectively. Such flanges 110 and 112 are extended in opposite directions to each other and serve as guiding foot portions for the trunnion supports, as will be later described.

The trunnion support walls 106 and 108 are fastened together by cross plates 114 and 116 secured between their inclined upper edges. A sleeve member 118 is secured between the walls 106 and 108 at their apex. A resilient support block 120 is received in the sleeve 118 and serves to center the trunnion pivot pin 122 which is received therethrough. The trunnion pin 122 is received through depending ribs 124 and 126 on the underside of the fifth wheel member 12. The pins 122 of the two trunnion supports 16 are aligned to provide the trunnion support of the fifth wheel member 12 allowing tiltable movement thereof.

The foot portions of the trunnion supports 16, provided by the flanges 110 and 112, are slidable on the base plate 14. The base plate 14 is formed to provide simple guide ways 128 for the supports 16. A cross plate 130 is secured to the base plate 14 and has its outer side edges disposed to serve as inner sides for the guide ways 128. The side edges of plate 14 are rolled, as at 132, to provide the outer sides of the guide ways 128. The rolled edge 132 also serves to retain the supports 16 to the base plate 14 due to their overlapping disposition relative to flanges 110.

The plate 130 need not extend to the ends of the base plate 14 to fulfill its guide function. The length of the base of the trunnion supports 16 is such that they will remain guided by the cross plate 130 even though it terminates short of the ends of the base plate 14. There is also another guiding means, as will be described.

The ends of guide ways 128 are closed by tie straps 134 which may also serve to secure the base plate 14 to the tractor vehicle. The straps 134 also act as stop means limiting the movement of trunnion supports 16 on the base plate 14. The tie straps 134 are disposed at each corner of the base plate 14 and extend across the ends of the guide ways 128.

Rack bar members 136 are secured to the base plate 14 and are disposed within guide ways 128 and between the trunnion support walls 160 and 108. The rack bars 136 thus also serve as guide members for the trunnion supports 16.

Access openings 138 and 140 are provided through the walls 106 and 108 of the trunnion supports. These accesses are aligned and are of such depth as will expose the rack surface of the rack bars 136. The access openings 138 and 140 are framed by side wall guides 142 and 144, and top wall guide 146. The wall guides 142, 144 and 146 each extend substantially beyond the outer faces of support walls 106 and 108. Such wall guides are secured to the support walls 106 and 108 and thereby serve as intermediate spacers, though this is not their principal function as will be shown.

Disposed between the trunnion supports 16, and under the fifth wheel member 12, is the power actuated locking mechanism 148 for securely engaging the trunnion supports to the base plate 14. This locking mechanism 148 is shown by Fig. 6 to include a power cylinder 150 having rack engaging shoe members 152 engaged thereto and actuated through the accesses 138 and 140 in the trunnion supports 16 for locking engagement with the rack bars 136.

The power cylinder 150 is a single piston air cylinder which has a yoke coupling 154 secured to its cylinder portion and a yoke coupling 156 secured to its cylinder portion and a yoke coupling 156 secured to the end of its piston rod member 158. The shanks 160 of the rack engaging shoe members 152 are engaged with the yoke couplings 154 and 156.

The rack engaging shoes include a head portion 162, at the end of shank 160, which is received through the trunnion support access 138 and 140. The shoe head 162 is guided by the guide walls 142, 144 and 146 for close reciprocal movement. The lower face of the shoe head 162 is formed to include rack teeth 164 complementary of the rack bar teeth 166. The shoe and rack bar teeth 164 and 166 are wedge shaped and engaged together only by movement centrally of the fifth wheel assembly. Coiled compression springs 168 are disposed about the shanks 160 of the shoe members, and are engaged between the power cylinder couplings 154 and 156, and the end of the guide wall 146, to hold the shoes in wedging engagement with the rack bars 136. A wall 170 is secured between side wall guides 142 and 144 to provide a suitable spring seat.

The power cylinder 150 is not secured to either the base plate 14 or the fifth wheel member 12. Thus it remains axially adjustable between the trunnion supports 16. This enables the single piston cylinder to serve the function of a double piston cylinder. When the power cylinder 150 is activated, as by a control in the cab, it acts to move the piston rod part 158 and there is a reactionary force tending to move the cylinder part thereof in the opposite direction. Since the spring members 168 act against the operating force of both the piston and cylinder they tend to equalize the operating force between the two rack engaging shoe members 152. Consequently, both shoes are, simultaneously, moved into engagement or disengagement with their respective rack bars 136.

*Operation*

The fifth wheel assembly 10 is mounted on the back of a tractor or cab unit 200, as shown by Fig. 7. The tie straps 134 or other means may be used to secure the assembly in place. The base plate 14 is disposed in substantially a horizontal position to afford both forward and backward tilting of the trunnioned fifth wheel member 12.

The fifth wheel plate member 12 is preferably located centrally of its span of adjustment on its supporting base 14 prior to receiving the trailer coupling pin 24.

When the power cylinder 150 is actuated it disengages the rack shoes 152 from the rack bars 136. The rack shoes 152 are extended farther through the supports 16 until their rack teeth 164 are disengaged from the rack teeth 166 of the rack bars 136. The shoes remain guided, at all times, by the access framing walls 142, 144 and 146 of the trunnion supports. The extension of guide walls 142, 144 and 146 serves both to guide the shoes 152 when they are extended and to provide some protection for them in their extended position.

When the power cylinder 150 is actuated, the cylinder and its piston part 158 are equally extended, due to the axial freedom of the cylinder which permits its reactionary movement, in equal and opposite directions. The piston and cylinder forces are resisted by the compression springs 168 on the shanks 160 of the rack shoes. This resistance force serves to equalize the movement of the rack shoes 152 and to return them, and hold them, in interlocking wedged engagement with the rack bars 136 when the piston cylinder 150 is inactive.

Once the rack engaging shoes 152 are extended sufficiently to have their rack teeth disengaged from the rack bars 136, the supports 16 are free to move on the base plate. The supports, with their fifth wheel 12, are adjusted to a new location on the base plate 14. The fifth wheel is adjustable in accord with the spacing of the rack and shoe teeth. Accordingly, there is provided a means of segmental adjustment for the fifth wheel.

When the fifth wheel is located in its new position, the power cylinder is inactivated so that the rack shoes 152 are re-engaged with the rack bars 136. Their wedging interengagement assures a secure engagement without any end play. The close fit of the rack shoe head 162 within the guide walls 142, 144 and 146 also assures a secure location free of end play.

A tractor and trailer units 200 and 202 are shown coupled together in Fig. 7 by the fifth wheel assembly 10 of this invention. The trailer unit 200 includes only a rear set of wheels 204 and rides pig-a-back on the tractor. Thus the back wheels 206 of the tractor unit 200 receive part of the weight of the trailer load.

The adjustable nature of the fifth wheel assembly 10 enables increasing or decreasing the distance between the wheels 204 and 206. The forward end of the trailer 202 extends forward of the back wheels 206 of the tractor 200. This enables shifting some of the trailer weight forward and between the tractor wheels. This in turn changes the axle loading on the trailer wheels 204 and the rear wheels 206 of the tractor.

The tractor 200 is shown in its forward and rearward extended positions by phantom outline in Fig. 7. The change in the wheel span is noted as $x$ and $x+y$; the factor $x$ being the wheel span with the trailer 202 in its forwardly extended position relative to the tractor 200, and the factor $y$ being the adjustment permitted the fifth wheel assembly 10.

It is to be understood that the adjustable character of the fifth wheel assembly of this invention has use other than in the particular type of tractor trailer unit illustrated. Furthermore, although the unit disclosed is operable from the cab, by means controlling the air cylinder, the unit may be manually operated and need not necessarily include the air cylinder.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. A fifth wheel coupling for use in engaging tractor and trailer units together, and comprising; a trunnioned fifth wheel assembly, trunnion supports having said fifth wheel assembly mounted thereon, a base plate having said trunnion supports received thereon, guide means mounted on said base plate and adjacent said trunnion supports, said trunnion supports being adjustable on said base plate and relative to said guide means, and means selectively interlocking said supports to said guide means at adjusted positions relative thereto, said interlocking means including tapered wedges secured to said base plate and disposed within said trunnion supports, and at least one tapered wedge received through said supports and meshable with said tapered wedges whereby said trunnion supports and said base plate may be interlocked.

2. A fifth wheel coupling for use in engaging tractor and trailer units together, and comprising; a trunnioned fifth wheel assembly, trunnion supports having said fifth wheel assembly mounted thereon, a base plate having said trunnion supports received thereon for guided adjustable movement relative thereto, toothed rack members having tapered ends mounted on said base plate and disposed for cooperative interengagement with said supports, and toothed rack engaging shoes having tapered ends mounted for reciprocal movement through the side walls of said supports and for interlocking engagement with said toothed rack members.

3. A fifth wheel coupling for use in engaging tractor and trailer units together, and comprising; a trunnioned fifth wheel assembly, trunnion supports having said fifth wheel assembly mounted thereon, a base plate having said trunnion supports received thereon, toothed rack members having tapered ends mounted on said base plate and having said trunnion supports received for linear guided reciprocal adjustment relative thereto, and toothed rack engaging shoes having tapered ends mounted for reciprocal travel through the side walls of said trunnion supports and for selective interlocking engagement with said toothed rack members.

4. A fifth wheel coupling, comprising; a trunnioned fifth wheel member, parallel spaced trunnion supports having said fifth wheel member mounted thereon, a base plate including means for receiving said trunnion supports for retained guided relative linear movement thereon, toothed rack members secured to said base plate and disposed next adjacent said trunnion supports, and a pair of intercooperative toothed rack engaging shoes mounted between said trunnion supports for interlocking engagement with said trunnion supports and said toothed rack members following the selected relative adjustment of said supports to said toothed rack members, said toothed rack and shoe members having wedge-shaped teeth in a direction transverse to said support plates to facilitate ease of reciprocal travel.

5. A fifth wheel coupling, comprising; a trunnioned fifth wheel member, parallel spaced trunnion supports having said fifth wheel member mounted thereon, a base plate including means for receiving said trunnion supports for retained guided relative linear movement thereon, toothed rack members secured to said base plate and disposed next adjacent said trunnion supports, a pair of intercooperative toothed rack engaging shoes mounted between said trunnion supports, said supports being formed to receive said shoes through the side walls thereof and into interlocking engagement with said toothed rack members, an operative means for simultaneously disengaging said shoes from said toothed rack members for the selected readjustment of said supports on said base plate and relative to said rack members.

6. A sliding fifth wheel assembly, comprising; a trunnioned fifth wheel member, trunnion supports including parallel spaced plate members, a base plate receiving said trunnion supports in guided slidable relation thereon, toothed rack members secured to said base plate and disposed between said trunnion support plates, said support plates being formed to provide an access therethrough exposing said rack members, a pair of toothed rack engaging shoes received through said accesses for interlocking engagement with said support plates and said toothed rack members, operative means disposed between said trunnion supports and connected to said shoes for simultaneously disengaging said shoes from engagement with said rack members by extension of said operative means, said operative means including a power actuated piston cylinder having one of said shoes engaged to the piston part thereof and the other of said shoes engaged to the cylinder part thereof, resilient means for simultaneously retracting said shoes, and means engaged between said operative means and said trunnion supports for maintaining said operative means freely adjustable axially of said supports.

7. A fifth wheel coupling for use in engaging tractor and trailer units together comprising; a fifth wheel means supported on the tractor; spaced rack members supported on said tractor, said rack members having tapered teeth of substantial thickness; tapered wedge elements associated with said fifth wheel means and engaging said tapered teeth, and operator means for withdrawing said tapered wedge elements from engagement with said tapered teeth to provide movement of one with respect to the other.

8. A fifth wheel coupling for use in engaging tractor and trailer units as in claim 7 wherein said tapered wedge elements have a plurality of tapered teeth of substantial thickness and said operator means includes means continuously urging said wedge elements tapered teeth into engagement with said rack structure tapered teeth to form a rigid connection therebetween, said tapered teeth of said wedge elements and rack members being arranged to permit further wedging of the tapered teeth of said wedge elements between the tapered teeth of said rack members to thereby compensate for wear.

9. A sliding fifth wheel assembly, comprising: a trunnion fifth wheel member, a pair of trunnion supports each including a pair of L-shaped parallel spaced members, each L-shaped plate member having an upstanding trunnion support portion and a foot portion, a base plate receiving said foot portions of said trunnion supports in guided slidable relation thereon, toothed rack members secured to said base plate and disposed between each of said pair of trunnion support plates for guiding the same, said support plate being formed to provide an access thereto exposing said rack members, a pair of toothed rack engaging shoes received through said accesses for interlocking engagement with said tooth rack members, and means for movably operating said tooth engaging shoes for selectably engaging and disengaging said shoes with said rack members.

10. The fifth wheel assembly of claim 9 in which the tooth rack members and trunnion supports are located adjacent opposite edges of said base plate and said edges are bent upwardly and inwardly over the one foot portion of each pair of trunnion supports.

References Cited in the file of this patent

UNITED STATES PATENTS

| | | |
|---|---|---|
| 2,330,897 | Kirksey | Oct. 5, 1943 |
| 2,589,678 | De Lay | May 18, 1952 |
| 2,755,104 | Braunberger | July 17, 1956 |
| 2,835,504 | Acker | May 20, 1958 |
| 2,860,891 | Ramun | Nov. 18, 1958 |